United States Patent [19]
Poulos et al.

[11] Patent Number: 5,794,344
[45] Date of Patent: Aug. 18, 1998

[54] STRAWBERRY CORE REMOVER

[76] Inventors: Matthew Alexander Poulos; Joyce Shordone Poulos, both of 20544 Yeandle Ave., Castro Valley, Calif. 94546

[21] Appl. No.: 759,751

[22] Filed: Dec. 3, 1996

[51] Int. Cl.$^6$ ............................................. A47J 23/00
[52] U.S. Cl. .................................... 30/113.1; 30/316
[58] Field of Search ........................ 30/113.1, 113.3, 30/280, 301, 316, 368; 172/19

[56] References Cited

U.S. PATENT DOCUMENTS

| | | | |
|---|---|---|---|
| 1,008,226 | 11/1911 | Wanlin | 30/368 |
| 1,572,524 | 2/1926 | Flannery | 30/368 |
| 1,631,175 | 6/1927 | Winkler | 30/368 |
| 2,843,135 | 7/1958 | Lisiewski | 30/316 X |
| 3,384,963 | 5/1968 | Brando | 30/316 X |
| 4,596,073 | 6/1986 | Ewald | 30/113.1 |
| 4,949,459 | 8/1990 | Noble | 30/113.1 |
| 5,092,043 | 3/1992 | Shirkey | 30/113.1 |

*Primary Examiner*—Douglas D. Watts
*Attorney, Agent, or Firm*—Robert Samuel Smith

[57] ABSTRACT

A device for coring strawberries including a cutting tube having a cutting end over which the strawberry is slid to separate the meat from the core. In one embodiment, an ejector rod is slidably positioned inside the cutting tube and an ejector sleeve is slidably positioned on the outside of the cutting tube. The ejector rod is coupled to the sleeve by a screw through a slot in the cutting tube. The ejector tube is spring loaded so that the separated core may be ejected from the cutting tube by sliding the ejector rod toward the cutting end. A spring return returns the rod and sleeve to a rest position. In another embodiment, the ejector rod is actuated separately from the sleeve to eject the core and the sleeve is then actuated to eject the meat. The sleeve and rod are compression spring loaded to restore the rod and sleeve to the initial position.

8 Claims, 3 Drawing Sheets

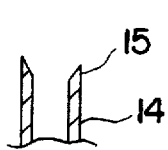
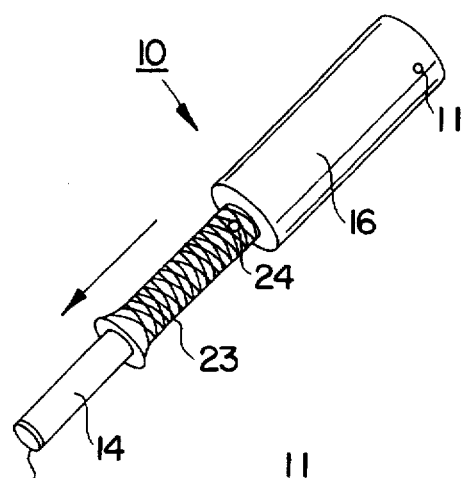
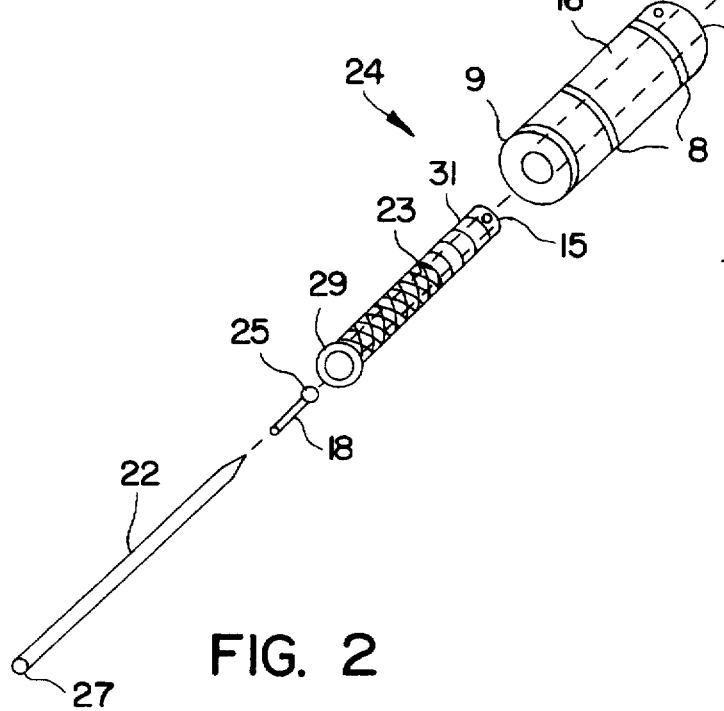
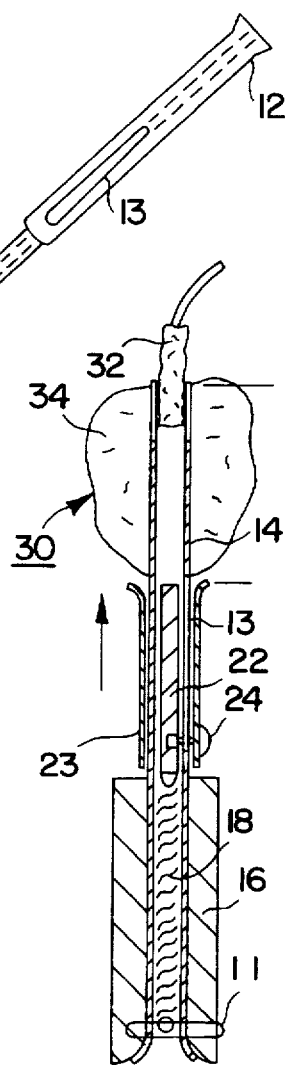
FIG. 4
FIG. 1
FIG. 2
FIG. 3

STRAWBERRY CORE REMOVER

FIELD OF THE INVENTION

This invention relates to devices that remove cores from strawberries and particularly to a device that is self cleaning.

PRIOR ART AND INFORMATION DISCLOSURE

Preparation of a strawberry has typically involved the single step of pulling off the stem from the berry. This has left the berry with a sweet fleshy exterior but a core which is harder and less tasty so that when the diner eats the whole berry, his pleasure of eating is somewhat diminished by his having to consume both parts of the berry. In recent years, it has been recognized that removal of the core along with the stem adds to the pleasure of consuming the berry. Several devices have been disclosed for separation of the outer meat of the berry from the stem and core.

For example, U. S. Pat. No. 4949459 to Noble discloses a device including a tubular member attached to a handle. The tubular member is directed through the center of the strawberry until the stem and core are detached from the strawberry. Then the stem and core are pulled out of the tube. Successful operation of the invention depends on the stem not being separated from the core until after the stem has been pulled out of the tube.

U.S. Pat. No. 5,092,043 to Shirkey discloses a strawberry stem/core remover including a tubular member mounted on a handle. The strawberry is pushed down over the free end of the tube which cuts through the strawberry and separates the core from the outer meat of the berry. The core being removed from a subsequent strawberry forces the core from a preceding berry through the tube toward an exit end of the core so that, when a sufficient number of berries have been cored, the cores from subsequent berries are forced out of the exit end of the core.

U. S. Pat. No. 4,596,073 to Ewald discloses an apple corer having a handle on one end of a hollow cutting tube having a cutting edge on an opposite end. The cutting tube also has a longitudinal slot extending partially along the wall of the tube. A core remover comprises a pair of tubes. One tube of the pair is slidably positioned inside the cutting tube and the other tube of the pair is slidably positioned on the outside of the cutting tube. A faceplate is formed on ends of the inside tube and outside tube closest to the cutting edge and has a C shaped opening so that the cutting tube is slidably positionable in the C shaped opening with respect to the core remover. The face plate has prongs interior to the cutting tube for impaling the core and enabling the user to turn the cutting tube in a twisting motion to separate the core from the outer meant of the apple.

The Ewald device is constructed for coring apples and therefore requires a different effort than is required for coring strawbenies. More force is required to eject the core so that the operator must perform three steps to core the apple. In the first step, the cutting tube pierces the apple and separates the core from the meat. In the second step, the operator grasps the handle of the device in one hand and slides the meat of the apple off the cutting tube with the other hand. In the third step, he forces the corer towards the cutting edge.

One of the problems associated with the construction of the Ewald invention is the difficulty of cleaning the device after use. The problem is exacerbated by the requirement to clean any debris out of between the cylinders of the core remover.

SUMMARY

It is an object of this invention to provide a device for coring strawberries which is more convenient, permits faster repetitive operation and allows a more thorough and easier cleaning method after use.

This invention is directed toward a hollow cutting tube with a core removing rod slidably positioned inside the tube and a sleeve slidably positioned on the outside of the cutting tube. The cutting tube has a handle on one end opposite a cutting end. A longitudinal slot is intermediate between the cutting end and the handle end. A screw passes through the sleeve and slot and is screwed into the rod so that, in operation, the sleeve and slot move in unison when in use for coring the strawberry. A helical spring inside the cutting tube has one end attached to an end of the rod distal from the cutting edge of the tube. The other end of the spring is detachably secured adjacent to the the handle end of the tube by a removable pin (or screw) through the handle and tube and through a loop end of the spring inside the handle.

The device may be held free by the the handle in one hand or may be secured vertically to a table top for faster repetitive operation.

BRIEF DESCRIPTION OF THE FIGURES

FIG. 1 is an assembly view of the coring device for strawberries.

FIG. 2 is an exploded view of the device of FIG. 1.

FIG. 3 is a sectional view of the device of FIG. 1.

FIG. 4a is a sectional view of the cutting end of the cutting tube.

FIG. 4b show the cutting end of the cutting tube.

DESCRIPTION OF A BEST MODE

Figure 5A:
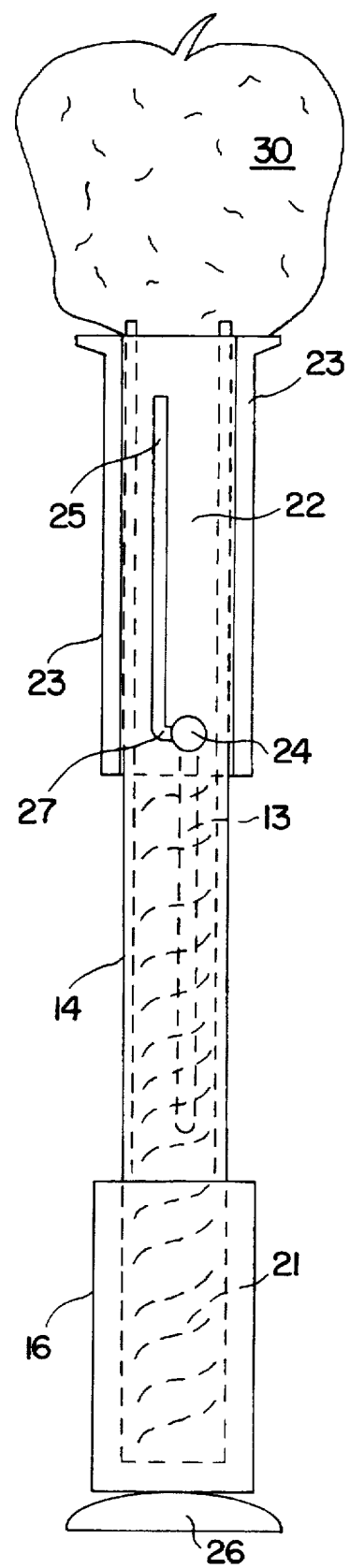
FIGS. 5 A, B, C, and D show another embodiment of the invention and the steps for using the second embodiment to core a strawberry.

Turning now to a discussion of the drawings, Table 1 is a list of the reference numbers shown in the drawings;

TABLE 1

10 The invention
11 pin for retaining a spring end
12 flared end of cutting tube
13 slot in cutting tube
14 cutting tube
15 cutting end of cutting tube
16 handle
18 spring
21 compression spring
22 ejector rod
23 ejector sleeve
24 screw through opening 31 in ejector sleeve, cutting tube and into ejector rod
25 loop end of spring
26 vacuum cup
27 coring end of ejector rod
29 coring end of ejector sleeve
30 strawberry
32 strawberry core
34 strawberry meat
36 notches in slot 13

FIG. 1 is an assembly view of the invention 10. FIG. 2 is an exploded view and FIG. 3 is a sectional view of FIG. 1 showing a cutting tube 14 with a flared end 12 and a longitudinal slot 13. The cutting tube 14 has a cutting end 15 opposite handle 16. The cutting end has a sharpened end as shown in the sectional cutaway view of FIG. 4A and serrated as shown in the perspective view of FIG. 4B. A handle 16 is preferably slipped onto the cutting tube at the flared handle end 12. An ejector rod 22 is positioned inside the cutting tube 14. An ejector sleeve 23 slides onto the outside of cutting tube 14 and is secured to ejector rod 22 by a screw 24 extending through an opening in sleeve 23 and longitudinal slot 13. A helical spring 18 is positioned inside the cutting tube 12 with one spring end secured to an end of the ejector rod 22 distal from the cutting end and another spring end secured by a pin 11 through the handle 16 and cutting tube 15 and through an end loop 25 of spring 18.

As shown in FIG. 3, in the rest (initial) position A, the coring end 27 of the ejector rod 22 is recessed inside the cutting tube 14 spaced from the cutting edge 15 by a distance equal to or greater than the length of the strawberry 30. To perform the coring operation, a strawberry 30 is centrally placed on the cutting end 15 of the cutting tube 14. As shown in FIG. 3, the strawberry 30 is pulled down over the cutting tube 14 so that the core 32 is separated from the meat 34 and the core 32 and stem are left at the end 15 of the cutting tube 14 while the strawberry slides down to the ejector sleeve. The stem and core 32 can now be pulled out and discarded from the end 15 of the cutting tube 14. With one hand grasping the handle 15, the ejector sleeve 23 is slid toward the cutting end 15 thereby ejecting the strawberry from the cutting tube 14 and simultaneously cleaning out any debris caught inside the cutting tube 14. After the ejector sleeve 23 is released, the spring 18 (under tension when the ejector core has been extended to push the core out of the cutting tube) draws the ejector rod 22 and sleeve 23 back to its original position so that the device is clean and ready for the next strawberry.

FIGS. 5 A, B, C, D show another embodiment in which the opening for screw 24 in ejector sleeve 23 is an elongated slot 25 with a notch 27 at one end. Screw 24 screws into ejector rod 22 (shown in phantom in FIGS. 5A, B, C and D. Helical compression spring 21 for returning the ejector rod to the rest position is shown in phantom. Helical compression spring 31 is positioned between the end of ejector rod 22 and the end of cutting tube 14.

FIGS. 5A,B,C, D show the successive steps in coring the strawberry. A vacuum cup 26 is shown on the handle 16 for securing the device in an upright position and leaving both hands of the operator free for coring.

Figure 5B:
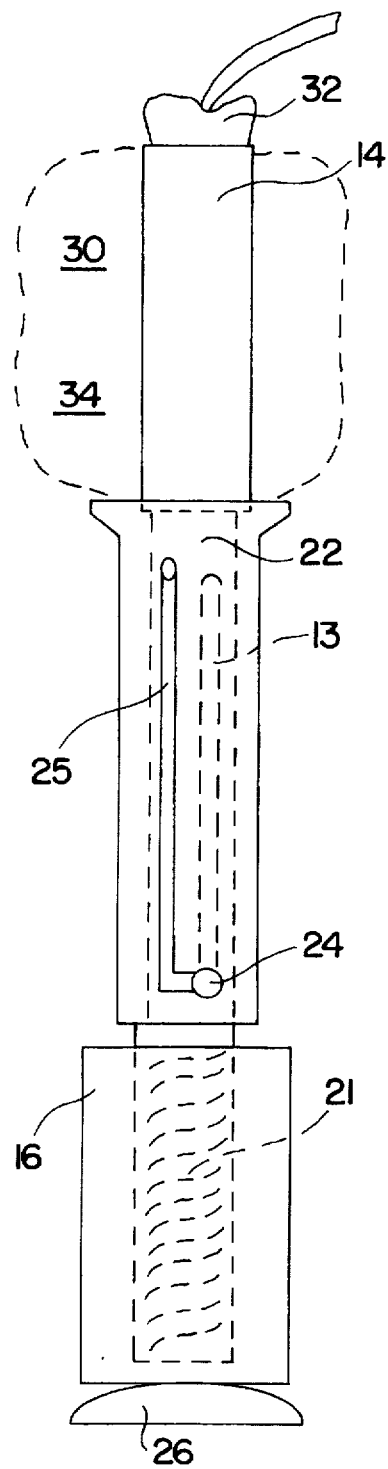
Figure 5C:
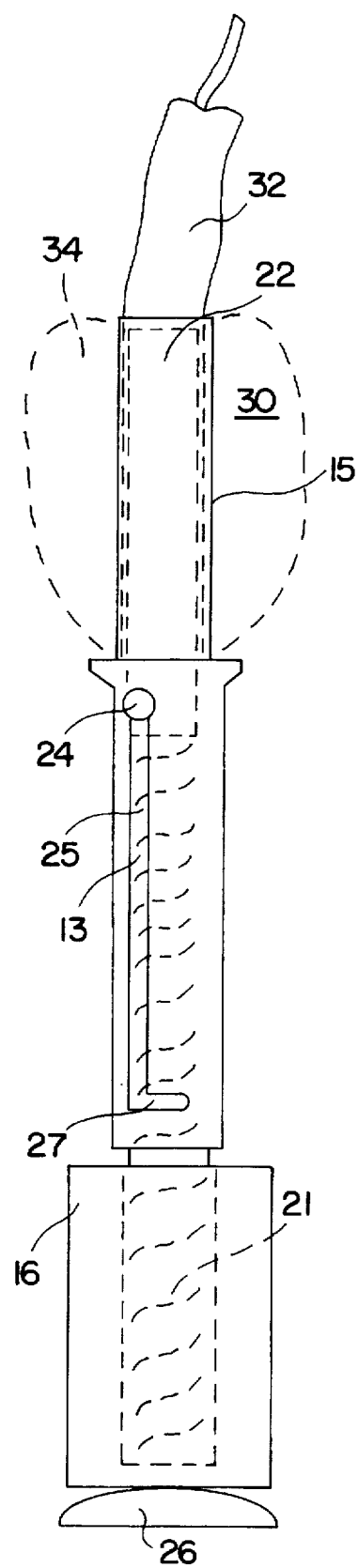
Figure 5D:
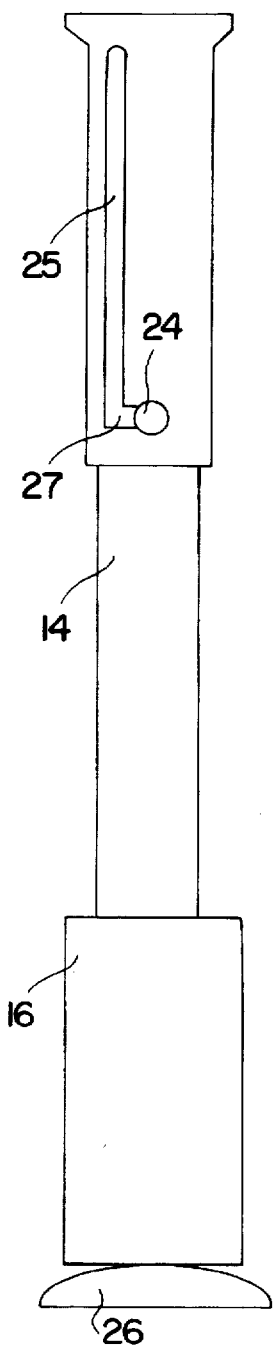

In 5A, the ejector sleeve 23 and ejector rod 22 are in the initial rest position in cutting tube 22. The coring end 27 of the ejector tube and and coring end 29 of ejector sleeve 23 sleeve are coincident with the cutting end 15. The strawberry 30 is positioned for coring. In FIG. 5B, the strawberry 30 is pulled down against the cutting end 15 of cutting tube 14 thereby separating the core 32 from the meat 34. The screw 24 engaged in notch 27 ensures that the ejector rod 14 and ejector sleeve 23 will move together. In FIG. 5C, the operator has rotated the ejector sleeve 23 thereby disengaging the sleeve from screw 24 so that compression spring 31 (compressed in the earlier steps) has pushed ejector rod 22 to its rest position and ejected the core 32 from the cutting tube 14. In step 5D, the operator has restored the ejector sleeve to the resting position of FIG. 5A thereby stripping the meat off the cutting tube 22 and then he has rotated ejector sleeve 23 so that the device is ready for the next strawberry.

A device for coring strawberries has been described which has useful advantages over the devices of the cited art. The spring return in both embodiments reduces the amount of effort required by the operator and substantially speeds up the operation. The second embodiment is particularly adapted to the situation where the strawberries are very thick and the long core tends to be lodged in the cutting tool. The device is readily dissembled for thorough cleaning in contrast to the cited art. Preferably, the handle 16 is a plastic and the other parts of the device, the cutting tube and ejector sleeve and rod are made of stainless steel.

Variations and modifications of this device may be suggested by studying the drawings and reading the specification that are within the scope of the invention and which further distinguish the invention from other devices which are the present state of the art.

For example, the handle has a sufficiently large diameter to facilitate gripping the the device.

FIG. 1 notches 36 formed in the side of the slot. 13 of the ejector tube. The screw 24 may be engaged with any one of these notches so that the ejector rod may be temporarily secured with a fixed extension from the cutting tube. This feature is very useful for garnishing where it is desired to impale the strawberry down to a fixed depth determined by selection of the notch engaging the screw.

Various materials may be selected to construct components of the device. The handle 16 is preferably plastic although wood may also be used. The metal parts are preferably stainless steel although they may also be made from aluminum alloys.

I therefore wish to define the scope of my invention by the appended claims.

What is claimed is:

1. A device for coring a strawberry comprising:

a cutting tube having a cutting end and a handle end and a longitudinal slot extending axially in a wall of said tube intermediate said handle end and said cutting end;

an ejector rod slidably positioned inside said cutting tube with a proximal rod end closest to said cutting end and a distal rod end closest to said handle end;

an ejector sleeve slidably positioned on an outside of said cutting tube with a proximal sleeve end closest to said cutting end and a distal sleeve end closest to said handle end;

a screw through an opening in said ejector sleeve and said longitudinal slot in said cutting tube and screwed into said ejector rod providing that said screw is positionable between ends of said longitudinal slot in said cutting tube;

helical spring means inside said cutting tube and extending between said handle rod end and said handle end of said cutting tube for restoring said ejector rod to a rest position inside said cutting tube.

2. The device of claim 1 which further comprises:

said spring means having one end secured to said handle end of said cutting tube;

means for securing another end of said spring means to said handle end of said rod;

said rest position being where said proximal rod end is spaced from said cutting end by a distance substantially equal to a length of said strawberry from a stem location on said strawberry where a stem of said strawberry is attached to said strawberry and an opposite location on said strawberry providing that a user is enabled to place said cutting end against said opposite location, push said cutting tube through said strawberry thereby separating a core and stem of said strawberry from meat of said strawberry, pulling said stem and core from inside said cutting end, grasping said ejector sleeve and sliding said ejector sleeve and ejector rod toward said cutting end whereby said meat and any debris in said cutting tube are ejected from said device, releasing said ejector sleeve permitting said spring means to return said ejector rod and sleeve to said rest position.

3. The device of claim 1 which further comprises:

said opening in said ejector sleeve being elongated in an axial direction and having a notch proximal to an end of said elongated opening closest to said distal end of said ejector sleeve;

said helical spring means inside said cutting tube being a compression spring arranged such that: said ejector rod and ejector sleeve in said rest position have proximal ends close to said cutting end of said cutting tube permitting an operator to pull a strawberry onto said cutting tube such as to separate a meat of said strawberry from a core of said strawberry while compressing said helical spring means and forcing said ejector rod and sleeve towards said handle end of said cutting tube then rotate said sleeve such as to release said ejector rod from said sleeve permitting said helical spring to force said ejector rod back to said rest position then pushing said sleeve such as to strip said meat from said cutting tube and rotate said sleeve to reengage said screw in said notch in preparation for a next strawberry.

4. The device of claim 1 which further comprises a vacuum cup means adapted for supporting the device in a vertical orientation on a horizontal surface.

5. The device of claim 1 wherein said cutting edge has a sharpened edge.

6. the device of claim 1 which comprises a handle tube with a bore and said handle end of said cutting tube is pressed into said bore.

7. The device of claim 2 wherein said another end of said spring means has an end loop and said means for securing said another end of said spring is a pin through said handle and said end loop.

8. The device of claim 1 which comprises a plurality of notches along one side of said slot providing that said ejector sleeve and tube, secured together by said screw is enabled to be rotated relative to said cutting tube thereby detachably securing said ejector tube and rod at selected extensions from said cutting tube providing that said device is usable as a tool for garnishing a strawberry to a fixed depth.

* * * * *